United States Patent
Noh

(10) Patent No.: US 7,630,498 B2
(45) Date of Patent: Dec. 8, 2009

(54) ENGINE, REGISTER AND METHODS FOR THE SAME

(75) Inventor: Mi-jung Noh, Yongin-si (KR)

(73) Assignee: Samsung Electronics.Co., Ltd., Gyeonggi-do (KR)

( * ) Notice: Subject to any disclaimer, the term of this patent is extended or adjusted under 35 U.S.C. 154(b) by 872 days.

(21) Appl. No.: 11/033,838

(22) Filed: Jan. 13, 2005

(65) Prior Publication Data
US 2005/0193214 A1    Sep. 1, 2005

(30) Foreign Application Priority Data
Feb. 28, 2004   (KR) ............... 10-2004-0013780

(51) Int. Cl.
*H04L 21/00*   (2006.01)
(52) U.S. Cl. .................................... 380/281
(58) Field of Classification Search .......... 380/81
See application file for complete search history.

(56) References Cited

U.S. PATENT DOCUMENTS

| | | | |
|---|---|---|---|
| 5,481,610 A * | 1/1996 | Doiron et al. | 380/270 |
| 6,185,307 B1 | 2/2001 | Johnson, Jr. | |
| 7,362,863 B2 * | 4/2008 | Lindemann et al. | 380/259 |
| 2002/0191784 A1 | 12/2002 | Yup et al. | |
| 2003/0021417 A1 | 1/2003 | Vasic et al. | |
| 2003/0105967 A1 | 6/2003 | Nam | |
| 2003/0108206 A1 | 6/2003 | Diehl et al. | |

FOREIGN PATENT DOCUMENTS

| | | |
|---|---|---|
| EP | 1 221 690 A1 | 7/2002 |
| KR | 10-2002-0065377 | 8/2002 |

OTHER PUBLICATIONS

Korean Office Action dated Sep. 28, 2005 (with English translation).
German Office Action (dated Nov. 27, 2007) for counterpart German Patent Application 10 2005 010 783.4-31 is provided for the purposes of certification under 37 C.F.R. §§ 1.97(e) and 1.704(d).

* cited by examiner

*Primary Examiner*—Andrew L Nalven
(74) *Attorney, Agent, or Firm*—Harness, Dickey & Pierce, P.L.C.

(57) ABSTRACT

An engine, register in a memory, and methods for the same are provided. The engine may include a data encryptor, a key encryptor, a data decryptor, a key decryptor, a register, and a control circuit. The data encryptor may encrypt data using a key. The key encryptor may encrypt the key used by the data encryptor. The data decryptor may receive encrypted data from a storage medium and may decrypt the encrypted data. The key decryptor may receive an encrypted key from the storage medium and may decrypt the encrypted key. The register may indicate the status of the key and/or the encrypted key. The control circuit may control the data encryptor, the data decryptor, the key encryptor, the key decryptor, and the register.

18 Claims, 7 Drawing Sheets

ENGINE, REGISTER AND METHODS FOR THE SAME

BACKGROUND OF THE INVENTION

This application claims the benefit of Korean Patent Application No. 2004-13780, filed on Feb. 28, 2004, in the Korean Intellectual Property Office, the disclosure of which is incorporated herein in its entirety by reference.

1. Field of the Invention

Exemplary embodiments of the present invention relate to an encryption engine (e.g., an Advanced Encryption Standards (AES) engine), which may have a copy protection function, a register and methods for the same.

2. Description of the Conventional Art

In conventional digital televisions, broadcasting data may be illegally accessed and/or copied. Although authorized subscribers may receive broadcasting data transmitted by a broadcasting company, if a subscriber records the broadcasting data, recorded broadcasting data may be copied. To protect broadcasting data from being copied, an illegal copy protection engine may be used. The illegal copy protection engine may encrypt received broadcasting data, store the encrypted data, encrypt a key used to encrypt the data and store the encrypted key. When viewing the stored data, the illegal copy protection engine may first decrypt first the stored encrypted key, and then decrypt the data using the decrypted key.

A conventional illegal copy protection engine may be implemented using a data encryption (e.g., a data encryption standard (DES)) algorithm. The Data Encryption algorithm may be unstable and, subsequently, another encryption standard (e.g., an advance encryption standard (AES)) algorithm may be used.

SUMMARY OF THE INVENTION

Exemplary embodiments of the present invention provide an engine, which may have a copy protection function with an increased security level, a register in a memory, and methods for the same.

An exemplary embodiment of the present invention provides an engine, which may include a data encryptor, a key encryptor, a data decryptor, and a key encryptor. The data encryptor may encrypt data using a key, for example, a public key, a private key, or any other suitable key. The key encryptor may encrypt the key used by the data encryptor. The data decryptor may receive encrypted data from a storage medium and may decrypt the encrypted data. The key decryptor may receive an encrypted key from the storage medium and may decrypt the encrypted key.

Another exemplary embodiment of the present invention provide an engine, which may be adapted to selectively encrypt or decrypt at least one of received data, a key, encrypted data stored in a storage medium, or an encrypted key stored in a storage medium.

Another exemplary embodiment of the present invention provides a method, which may include encrypting a key and storing an encrypted key, encrypting data using the key and storing the encrypted data, receiving the encrypted key, decrypting the encrypted key, and storing a decrypted key, and receiving the encrypted data and decrypting the encrypted data, using the stored key.

Another exemplary embodiment of the present invention provides an encryption or decryption method. The method may include selectively encrypting or decrypting at least one of received data, a key, encrypted data stored in a storage medium, or an encrypted key stored in a storage medium.

Another exemplary embodiment of the present invention provides a register, which may be included in a memory. The register may include a first field indicating a selected key, a second field designating a first table and a second table when a key table includes the first table and the second table, a third field indicating an amount of program data, which may be stored in a storage medium a fourth field indicating whether the key may be encrypted or an encrypted key may be decrypted, and a fifth field indicating encryption of the key or decryption of an encrypted key.

In exemplary embodiments of the present invention, data encrypted by the data encryptor and the key encrypted by the key encryptor may be stored on the storage medium via an interface.

In exemplary embodiments of the present invention, the key decrypted by the key decryptor may be stored in a key table.

In exemplary embodiments of the present invention, the engine may further include a register, which may manage the key and the encrypted key, and a control circuit, which may control the data encryptor, the data decryptor, the key encryptor, the key decryptor, and the register.

In exemplary embodiments of the present invention, the control circuit may transition the engine into a busy state based on a command to scramble the key when the engine may be in an idle state.

In exemplary embodiments of the present invention, the control circuit may transition the engine into a busy state based on a command to descramble the encrypted key when the engine may be in an idle state.

In exemplary embodiments of the present invention, the engine may be in an idle state, an input FIFO may be full, and the control circuit may transition the engine into a busy state.

In exemplary embodiments of the present invention, the control circuit may transition the engine into an idle state, when at least one of a scramble operation and a descramble operation may be completed.

In exemplary embodiments of the present invention, the register may include a key index field, which may indicate an offset of a memory region determining a key to be used, a table index field, which may designate a first table and a second table when the key table includes the first table and the second table, a program field, which may indicate the amount of program data, which may be stored in the storage medium, a scramble/descramble field, which may determine whether the key may be encrypted or the encrypted key may be decrypted, and an enable field, which may indicate a command which the key may be encrypted or the encrypted key may be decrypted.

In exemplary embodiments of the present invention, the first table may be accessed by a processor.

In exemplary embodiments of the present invention, the second table may have a higher security level higher than the first table, and may be used as at least one of a space in which a generated key may be stored, and a space in which a key acquired via a smart card may be stored.

In exemplary embodiments of the present invention, the key encryptor may request a key to be scrambled based on indices stored in the table index field and the key index field, may receive the key to be scrambled from the key table, and may encrypt the received key using an embedded key when the enable field may be turned on and the scramble/descramble field may be turned off.

In exemplary embodiments of the present invention, the key decryptor may decrypt the encrypted key received from the storage medium using the embedded key, and may store the decrypted key in the key table based on the indices stored in the table index field and the key index field when the enable field may be turned on and the scramble/descramble field may be turned on.

In exemplary embodiments of the present invention, the encryption of the key and storing the encrypted key may further include, requesting from the key table, a key to be scrambled based on indices stored in the table index field and the key index field. Receiving and encrypting the key to be scrambled, storing the encrypted key in a key register.

In exemplary embodiments of the present invention, decrypting the encrypted key and storing the decrypted key in the key table may be performed when the enable field may be turned on and the scramble/descramble field may be turned on.

In exemplary embodiments of the present invention, the decrypting the encrypted key and storing the decrypted key in the key table may further include setting the encrypted key on a key register, decrypting the encrypted key setting on the key register using the embedded key, storing the decrypted key in the key table based on the indices stored in the table index field and the key index field.

In exemplary embodiments of the present invention, the engine may further include an encryptor adapted to encrypt at least one of a data using a key and the key, a decryptor receiving at least one of encrypted data from or an encrypted key from a storage medium and decrypting at least one of the encrypted data and encrypted key.

BRIEF DESCRIPTION OF THE DRAWINGS

Exemplary embodiments of the present invention will become more apparent by describing in detail exemplary embodiments thereof with reference to the attached drawings in which.

DETAILED DESCRIPTION OF THE EXEMPLARY EMBODIMENTS OF THE PRESENT INVENTION

Figure 1A:
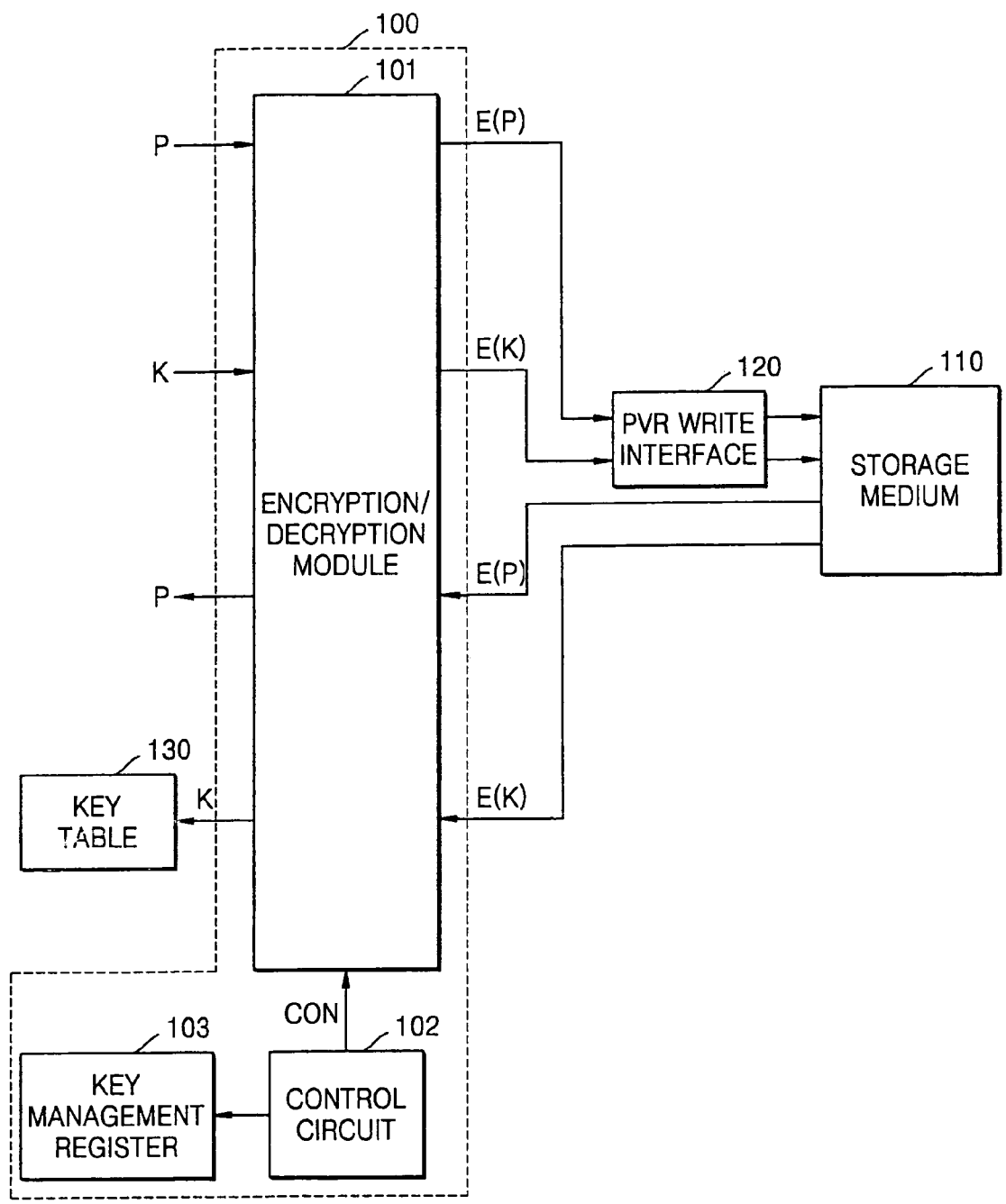
FIG. 1A is a block diagram of an engine according to an exemplary embodiment of the present invention.

The present invention will now be described more fully with reference to the accompanying drawings, in which exemplary embodiments of the present invention are shown. The same reference numerals are used to denote the same elements throughout the drawings. An engine (e.g., Advanced Encryption Standard (AES) engine) may encrypt broadcasting data, in order to prevent illegal copy, and/or decrypt the encrypted broadcasting such that viewers may view the data.

A security level may be determined according to a managing operation of a key used in encrypting broadcasting data and an engine according to an exemplary embodiment of the present invention may encrypt a key, store the key on a storage medium, access the key from the storage medium, decrypt the key, set the decrypted key, and decrypt corresponding broadcasting data.

Figure 1B:
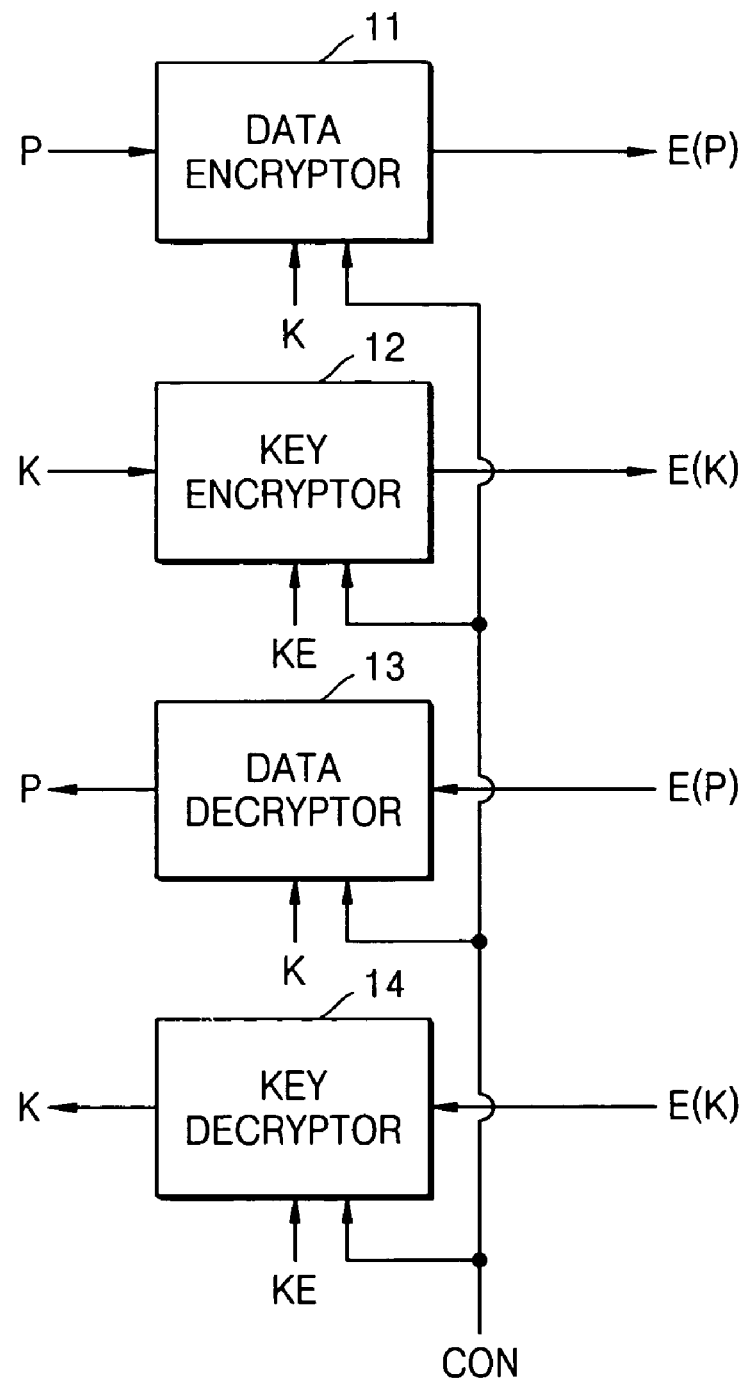
FIG. 1B is a diagram illustrating functions of in an example of an encryption/decryption module of the engine shown in FIG. 1A.

FIG. 1A is a block diagram illustrating an engine (e.g., an AES engine) 100 according to an exemplary embodiment of the present invention. A storage medium 110, an interface (e.g., Personal Video Recorder (PVR) write interface) 120, and a key table 130 are also illustrated. FIG. 1B is a diagram illustrating examples of functions, which may be performed by an module 101 of the engine 100 shown in FIG. 1A.

Referring to FIG. 1A, the engine 100 may include the module (e.g., an encryption/decryption module) 101, a control circuit 102, and a register (e.g., a key management register) 103.

The module 101 may include a data encryptor 11, a key encryptor 12, a data decryptor 13, and a decryptor 14. The module 101 may selectively perform data encryption, key encryption, data decryption, and key decryption according to the control of the control circuit 102.

The data encryptor 11 may encrypt received data (e.g., broadcasting data) P using a key K and may transmit encrypted data E(P) to the interface 120. The key encryptor 12 may encrypt the key K and may transmit an encrypted key E(K) to the interface 120. The transmitted and encrypted key E(K) may be stored in a key register of the interface 120. The interface 120 may be an interface connecting the engine 100 to the storage medium 110.

A processor (e.g., a central processing unit (CPU) (not shown)) may store the encrypted key E(K), stored in the key register of the interface 120, along with the encrypted data E(P) on the storage medium 110.

The data decryptor 13 may receive the encrypted data E(P) from the storage medium 110 and may decrypt the encrypted data E(P) using the key K. The key decryptor 14 may receive the encrypted key E(K) from the storage medium 110, may decrypt the encrypted key E(K), and may store a decrypted key K in the key table 130.

The control circuit 102 may control the encryptor 11, the key encryptor 12, the data decryptor 13, and the key decryptor 14 of the module 101, and the register 103. The control circuit 102 may include a finite state engine, which may enable encryption and/or decryption of the key K and data P in the module 101 of the engine. The register 103 may manage the key K and the encrypted key E(K). The configuration of the register 103 will be described later referring to FIG. 4.

Figure 2A:
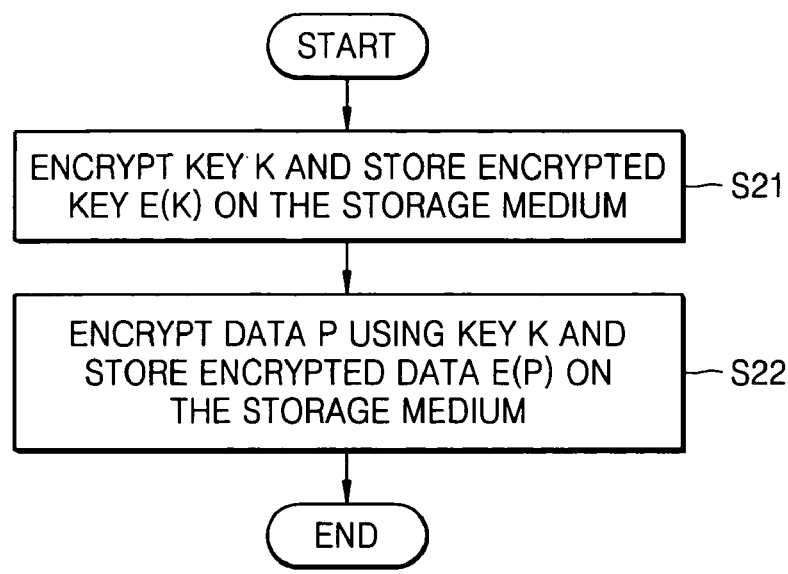
FIG. 2A is a diagram schematically illustrating an exemplary embodiment of an encryption process which may be performed by the engine of FIG. 1A.
Figure 2B:
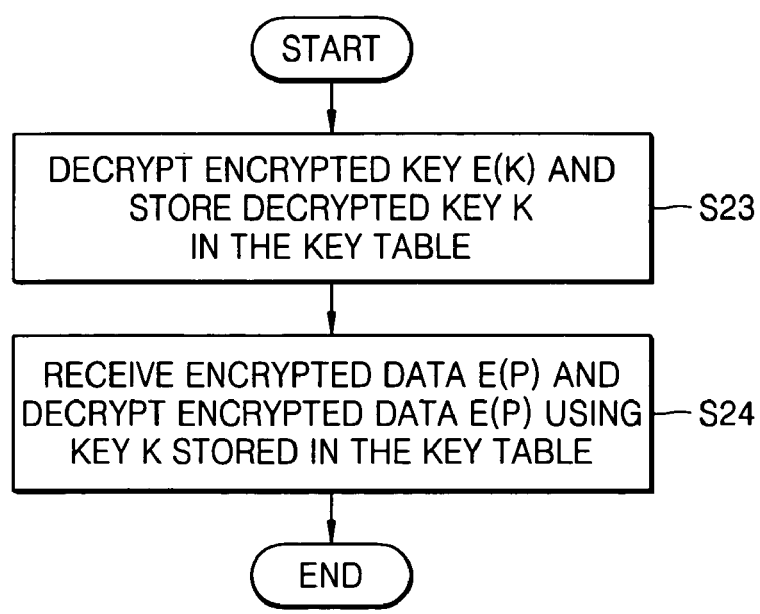
FIG. 2B is a diagram schematically illustrating an example of a decryption process which may be performed by the engine of FIG. 1.

FIG. 2A is a diagram illustrating schematically an exemplary embodiment of an encryption process, which may be performed in the engine 100. FIG. 2B is a diagram illustrating schematically, an exemplary embodiment of a decryption process, which may be performed in the engine 100.

Referring to FIG. 2A, at S21 the received broadcasting data P may be stored on the storage medium 110 and the key K may be encrypted by the key encryptor 12. The encrypted key E(K) may be stored on the storage medium 110 via the interface 120. At S22, the broadcasting data P may be encrypted using the key E(K) by the data encryptor 12 and the encrypted data E(P) may be stored on the storage medium 110 via the interface 120.

Referring to FIG. 2B, at S23, the broadcasting data P stored on the storage medium 110 may be played, the encrypted key E(K) may be received from the storage medium 110, and may be decrypted by the key decryptor 14. At S23, a decrypted key K may be stored in the key table 130. At S24, the encrypted data E(P) may be received from the storage medium 110 and may be decrypted using the key K stored in the key table 130 by the decryptor 13.

Exemplary embodiments of the key encryption process and the key decryption process of the AES engine 100 will be described later, referring to FIGS. 5 and 6.

Figure 3:
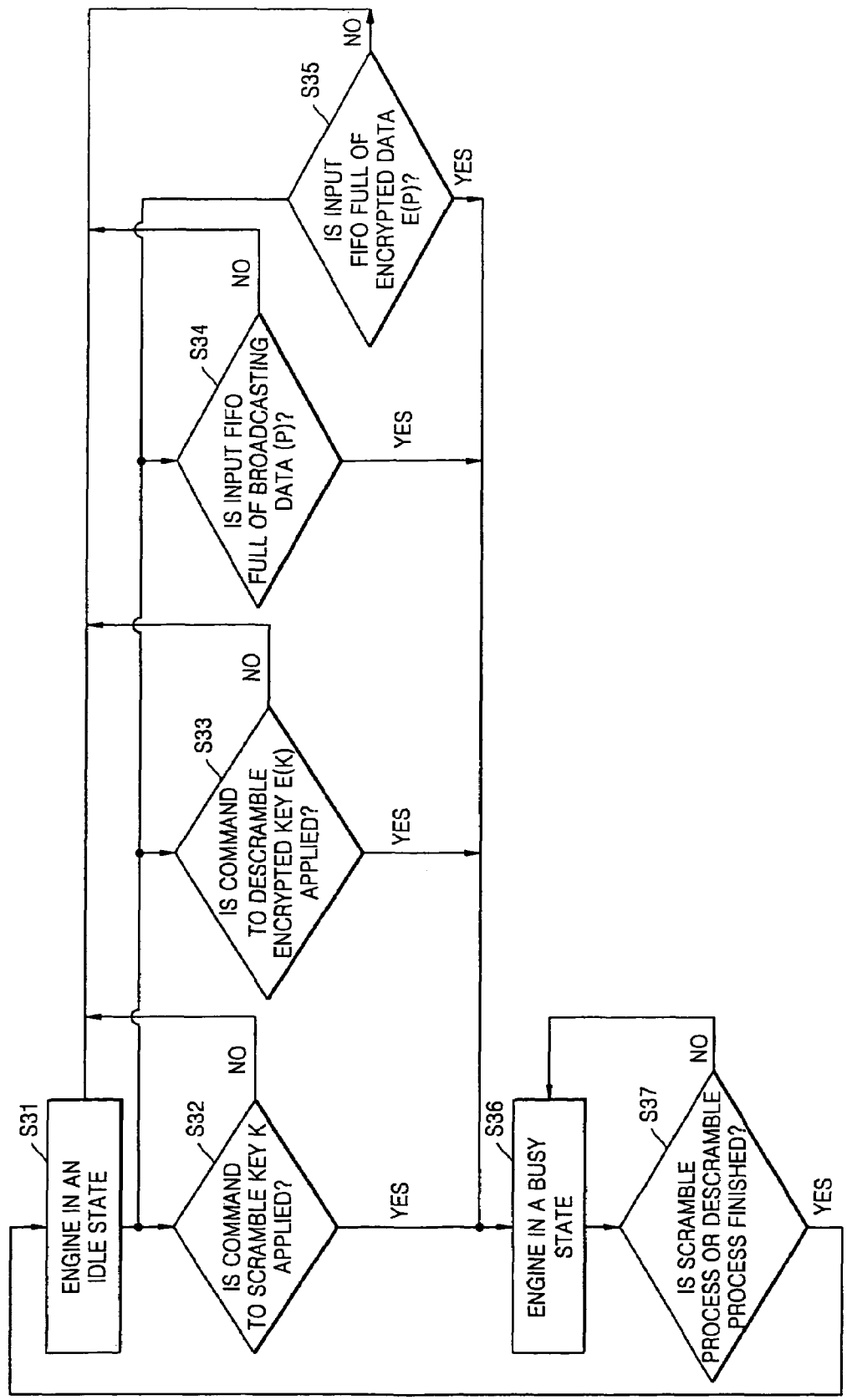
FIG. 3 is a flowchart illustrating a control scheme according to an exemplary embodiment of the present invention.

FIG. 3 is a flow chart illustrating an exemplary embodiment of a control scheme of the control circuit 102 shown in FIG. 1A.

Referring to FIG. 3, at S31, the engine 100 may be in an idle state and a key scramble operation may be performed at S32. The control circuit 102 may transition the engine 100 into a busy state. At S33, the engine 100 may be in an idle state and a key descramble operation may be performed. The control circuit 102 may transition the engine 100 into a busy state. At S34, the engine 100 may be in an idle state and the control circuit 102 may transition the engine 100 into a busy state, for example, when performing a data scramble operation, applying broadcasting data P and an input FIFO is full. At S35, the engine 100 may be in an idle state. The control circuit 102 may transition the engine 100 into a busy state when performing a data descramble operation, inputting the data E(P) stored on the storage medium 110 and the input FIFO is full.

At S36, the engine 100 may be in a busy state and at S37, the control circuit 102 may transition the engine 100 into an idle state when scrambling a key, descrambling a key, scrambling data, or descrambling data may finish.

Figure 4:
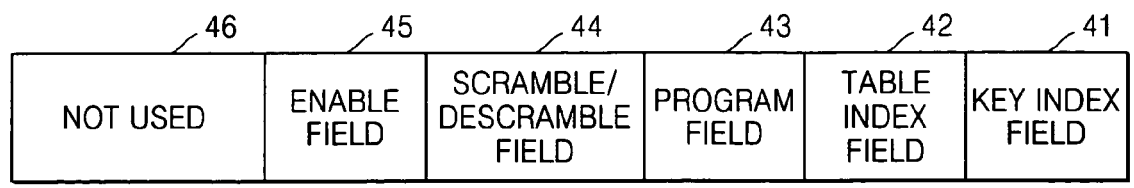
FIG. 4 is a diagram of a example configuration of an exemplary embodiment of a key management register shown in FIG. 1A.

FIG. 4 is a diagram of an example configuration of the register 103 shown in FIG. 1A, which may be included in a memory (e.g., Random Access Memory (RAM)). Referring to FIG. 4, the register 103 may be equipped with a key index field 41, a table index field 42 a program number field 43, a scramble/descramble field 44, and an enable field 45.

The key index field 41 may indicate an offset of a memory region, which may determine a key needed for copy protection.

The table index field 42 may determine a first table and a second table, for example, when the key table 130 is formed separately of the first table and the second table. The first table may be accessed by a central processing unit (CPU), may have a security level lower than a security level of the second table, and may be flexible. The second table may be related to an illegal copy protection function of a digital TV. The second table may be used as a space in which a key, generated using a random generator, may be stored and may be used as a space in which a key, acquired via a smart card provided from a broadcaster, may increase a security level. The configuration of the table index field 42 may have improved flexibility, higher security level, and may allow a key to be stored in a first table and/or a second table according to the user.

The program number field 43 may indicate how many program data may be stored on the storage medium simultaneously. Two program data may be stored on the storage medium simultaneously, and, the program number field 43 may correspond to a field, which may distinguish a first program data from a second program data.

The scramble/descramble field 44 may determine whether a key K may be encrypted or decrypted. The enable field 45 may indicate a command to encrypt the key K or to decrypt the encrypted key E(K). The control circuit 102 may monitor the enable field 45 of the register 103. The enable field 45 may be turned on, and a key encryption process may be performed by the key encryptor 12 or a key decryption process may be performed by the key decryptor 14. The key encryption process or the key decryption process may finish, and the enable field 45 may be turned off. The key encryptor 12 may encrypt the key K or the key decryptor 14 may decrypt the encrypted key E(K), and an embedded key KE may be used.

Figure 5:
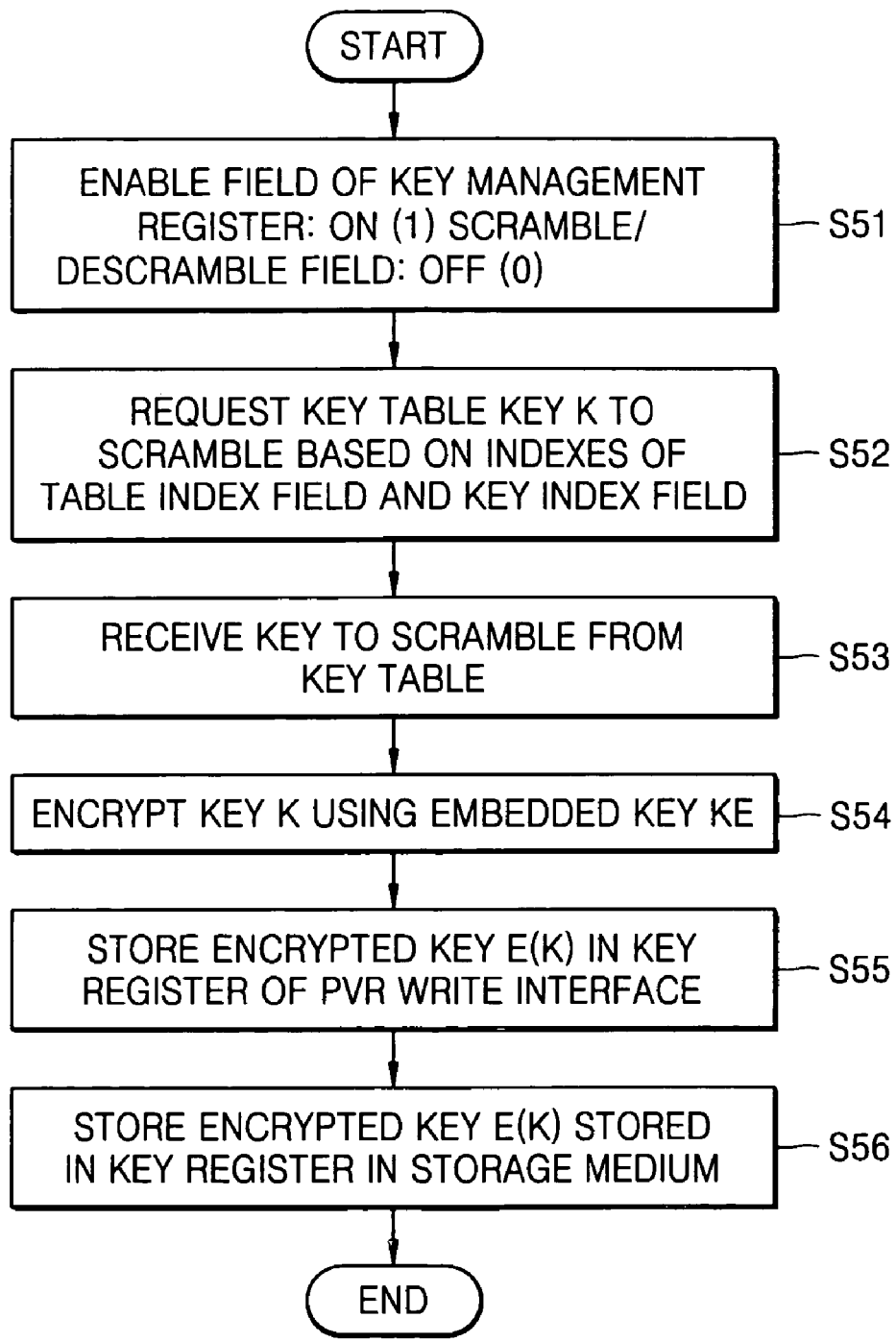
FIG. 5 is a flowchart illustrating an example key encryption process which may be performed by an exemplary embodiment of a key encryption device shown in FIG. 1B.

FIG. 5 is a flowchart illustrating an exemplary embodiment key encryption process, which may be performed by the key encryptor 12 shown in FIG. 1B. The key encryptor of the key encryptor 12 may correspond to S21 of FIG. 2A.

At S51, the enable field 45 of the register 103 may be turned on and the scramble/descramble field 44 may be turned off and the key encryption process of the key encryptor 12 may be performed. At S52, a key K may be sent to the key table 130, based on indices stored in the table index field 42 and the key index field of the register 103. At S53, a key K may be received at least one of the first table and the second table of the key table 130.

At S54, a received key K may be encrypted using the embedded key KE. At S55, an encrypted key E(K) may be stored in the key register of the interface 120. At S56, the CPU may store the encrypted key E(K) stored in the key register of the interface 120 in the storage medium 110.

Figure 6:
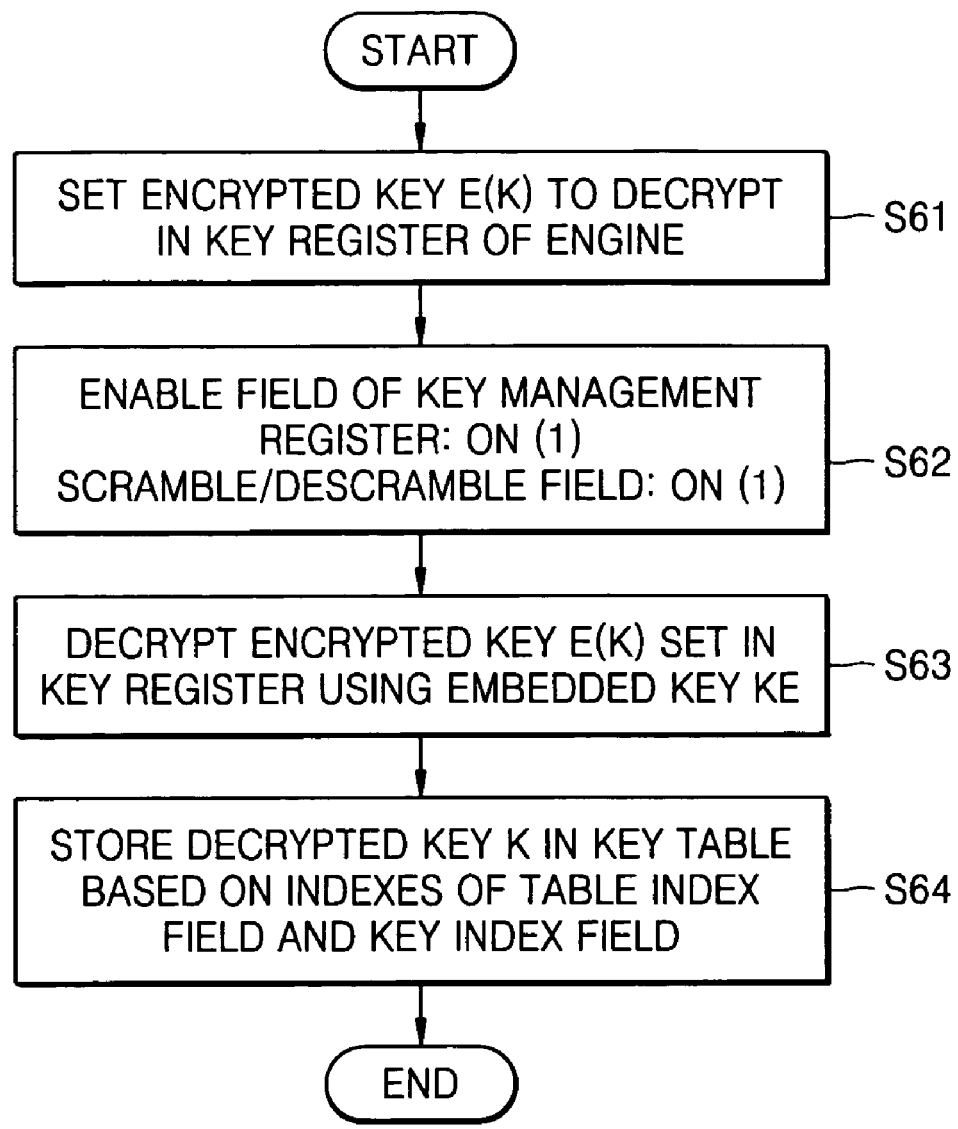
FIG. 6 is a flowchart illustrating an example key decryption process, which may be performed by an exemplary embodiment of a key decryption device shown in FIG. 1B.

FIG. 6 is a flowchart illustrating an exemplary embodiment of the key decryption process, which may be performed by the key decryptor 14 shown in FIG. 1B. The key decryption process performed by the key decryptor 14 may correspond to S23 of FIG. 2B.

At S61, the CPU may select the encrypted key E(K) to be decrypted by the key register of the engine 100. At S62, the enable field 45 of the register 103 may be turned on, the scramble/descramble field 44 may be turned on, and the key decryption process may be performed.

At S63, the encrypted key E(K), set in the key register of the engine 100, may be decrypted using the embedded key KE. At S64, the decrypted key K may be stored in the key table 130, based on indices stored in the table index field 42 and the key index field 41 of the register 103. The decrypted key K, stored in the key table 130, may be used, for example, when the data decryptor 13 receives encrypted data E(P) from the storage medium 110 and decrypts the encrypted data E(P).

Received broadcasting data may be stored on a storage medium, and the engine according to exemplary embodiments of the present invention may encrypt the broadcasting data, which may protect the broadcasting data from being illegally copied. The engine according to exemplary embodiments of the present invention may decrypt encrypted broadcasting data stored on the storage medium, for example, in real time. The engine according to exemplary embodiments of the present invention may encrypt (e.g., separately encrypt) a key used when the broadcasting data may be encrypted, and may store the key on the storage medium, which may increase a security level.

Although exemplary embodiments of the present invention have been described with respect to Data Encryption Standard (DES) and/or Advanced Encryption Standard (AES), it will be understood that exemplary embodiments of the present invention may be utilized in connection with any encryption standard or method.

Although exemplary embodiments of the module 101 has been described as including a data and a key encryptor 11 and 12, respectively, and a data and key decryptor 13 and 14, respectively, it will be understood that any combination of the data encryptor, key encryptor, data decryptor, and key decryptor may be included in one or more individual devices.

Although exemplary embodiments of the present invention have been described in connection with a personal video recorder (PVR) write interface, it will be understood that any suitable interface may be used.

Although exemplary embodiments of the present invention have been described with regard to a register included in, for example, a Random Access Memory (RAM), it will be understood that any suitable memory (e.g., Read Only Memory (ROM)) may be used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An engine comprising:
 a data encryptor configured to encrypt data using a key;
 a key encryptor configured to encrypt the key used by the data encryptor;
 a data decryptor configured to receive encrypted data from a storage medium and decrypting the encrypted data;
 a key decryptor configured to receive an encrypted key from the storage medium and decrypt the encrypted key;
 a register for managing the key and the encrypted key; and
 a control circuit controlling the data encryptor, the data decryptor, the key encryptor, the key decryptor and the register, wherein the register includes
  a key index field indicating an offset of a memory region for determining a key used,
  a table index field designating a first table and a second table when a key table includes a first table and a second table,
  a program field indicating the amount of program data, which can be stored in the storage medium simultaneously,
  a scramble/descramble field indicating whether the key is encrypted or the key is decrypted, and
  an enable field indicating encryption of the key or decryption of the encrypted key.

2. The engine of claim 1, wherein the encrypted data and the encrypted key are stored on the storage medium coupled to the encryption/decryption module via an interface.

3. The engine of claim 1, wherein the decrypted key is stored in the key table.

4. The engine of claim 1, wherein the control circuit transitions the engine into a busy state based on a command to scramble the key when the engine is in an idle state.

5. The engine of claim 1, wherein the control circuit transitions the engine into a busy state based on a command to descramble the encrypted key when the engine is in an idle state.

6. The engine of claim 1, wherein when the engine is in an idle state and an input FIFO is full, the control circuit transitions the engine into a busy state.

7. The engine of claim 6, wherein the input FIFO is full of the encrypted data input from the storage medium coupled to the encryption/decryption module.

8. The engine of claim 6, wherein the input FIFO is full of the data.

9. The engine of claim 1, wherein the control circuit transitions the engine into an idle state when at least one of a scramble operation and a descramble operation is completed.

10. The engine of claim 1, wherein the first table is accessible by a processor.

11. The engine of claim 1, wherein the second table has a security level higher than a security level of the first table, and is used as at least one of a space in which a generated key is stored, and a space in which a key acquired via a smart card is stored.

12. The engine of claim 1, wherein the key encryptor requests the key to be scrambled based on indices stored in the table index field and the key index field of the register, receives the key to be scrambled from the key table, and encrypts the received key using an embedded key when the enable field is turned on and the scramble/descramble field is turned off.

13. The engine of claim 1, wherein the key decryptor decrypts the encrypted key received from the storage medium using an embedded key, and stores the decrypted key in the key table, within the register, based on indices stored in the table index field and the key index field, of the register, when the enable field, of the register, is turned on and the scramble/descramble field, of the register, is turned on.

14. An encryption/decryption method, the method comprising:
 encrypting a key and storing an encrypted key;
 encrypting data using the key and storing the encrypted data;
 receiving and decrypting the encrypted key, and storing a decrypted key;
 receiving and decrypting the encrypted data, using the key; and
 managing the key and the encrypted key, wherein the managing includes
  indicating an offset of a memory region and determining a key required in copy protection,
  designating a first table and a second table when a key table is formed of the first table and the second table,
  indicating an amount of program data, which can be stored in a storage medium simultaneously,
  determining whether the key is encrypted or the encrypted key is decrypted, and
  enabling encryption of the key or decryption of the encrypted key, wherein
   encrypting the key and storing the encrypted key is performed when an enable field is turned on and a scramble/descramble field is turned off.

15. The method of claim 14, wherein the encrypting the key further includes,
 requesting the key to be scrambled based on indices stored in the table index field and the key index field,
 receiving the key to be scrambled from the key table,
 encrypting the received key using an embedded key, and
 storing the encrypted key in a key register.

16. The method of claim 14, wherein the decrypting the encrypted key and storing the decrypted key is performed when the enable field is turned on and a scramble/descramble field is turned on.

17. The method of claim 14, wherein the decrypting the encrypted key further includes,
 setting the encrypted key on a key register,
 decrypting the encrypted key setting on the key register using an embedded key, and
 storing the decrypted key in the key table based on indices stored in a table index field and a key index field.

18. An engine implementing the method of claim 14.

* * * * *